United States Patent [19]

Masuda et al.

[11] Patent Number: 5,128,622
[45] Date of Patent: Jul. 7, 1992

[54] MULTI-CHANNEL ELECTROSTATIC SENSOR APPARATUS

[75] Inventors: Noboru Masuda, Kawaguchi; Tetsuo Oosawa, Kita, both of Japan

[73] Assignee: Murata Mfg. Co., Ltd., Kyoto, Japan

[21] Appl. No.: 650,339

[22] Filed: Feb. 4, 1991

[30] Foreign Application Priority Data

Feb. 6, 1990 [JP] Japan ................................. 2-26359

[51] Int. Cl.⁵ ........................................... G01R 27/26
[52] U.S. Cl. ................................. 324/682; 324/458; 331/55; 369/129
[58] Field of Search ............. 324/452, 454, 457, 458, 324/603, 661, 662, 675, 674, 681, 682, 687; 331/50, 54, 55; 369/126, 129, 151

[56] References Cited

U.S. PATENT DOCUMENTS

| | | | |
|---|---|---|---|
| 4,058,766 | 11/1987 | Vogel et al. | 324/674 |
| 4,152,641 | 5/1979 | Hughes et al. | 324/661 |
| 4,228,393 | 10/1980 | Pile | 324/682 |
| 4,451,780 | 5/1984 | Ogasawara | 324/674 |
| 4,528,655 | 7/1985 | Tamura et al. | 331/117 D |
| 4,675,596 | 6/1987 | Smith | 324/674 |

OTHER PUBLICATIONS

"Application of a Phase Locked Loop in the Transmitter of a New Generation VHF Mobile Radio" by F. P. VanEnk, et al. of Phillips TMC Radio Communication Division, published by IREE on Aug. 20, 1975.

Primary Examiner—Kenneth A. Wider
Assistant Examiner—Diep Do
Attorney, Agent, or Firm—Townsend and Townsend

[57] ABSTRACT

Disclosed is a multi-channel electrostatic sensor apparatus including a main oscillation circuit; a plurality of pull-in type sub-oscillation circuits which are adapted to synchronize with the main oscillation circuit to generate sub-frequency signals whose frequency is equal to the main oscillation frequency or a multiple thereof; and a plurality of resonance circuits which are sensitive to any change in exterior capacitance when detected by an associated detector for changing its resonator resonance point with respect to the sub-frequency signal. Positive synchronization of the sub-oscillation circuits with the single main oscillation circuit prevents any adverse effect from being caused by the varying stray capacitance in flexible conductors connecting the sub-oscillation circuits to the main oscillation circuit while allowing the relatively free movement of the video heads of a video system, on which video heads the sub-oscillation circuits and subsequent components are attached.

9 Claims, 4 Drawing Sheets

MULTI-CHANNEL ELECTROSTATIC SENSOR APPARATUS

BACKGROUND OF THE INVENTION

1. Field of the Invention

The present invention relates to a multi-channel electrostatic sensor apparatus comprising a plurality of parallel channels each including a sensor circuit which is responsive to the change of an exterior capacitance for outputting a detection signal representing the change of the exterior capacitance.

2. Description of the Prior Art

A conventional electrostatic sensor uses a tank circuit having an exterior capacitance in its resonance circuit, thus providing an output signal whose frequency varies with the change of the exterior capacitance. This conventional electrostatic sensor is low in sensitivity. Recently, electrostatic sensors have become popular because of their relatively high sensitivity. (See U.S. Pat. No. 4,528,655). These electrostatic sensors use a resonance circuit whose resonant frequency is somewhat different from the oscillation frequency of an associated oscillator, and the capacitance of the resonance circuit is allowed to vary, thereby providing an amplitude-modulated signal. As shown in FIG. 1, it comprises oscillator circuit 1, resonance circuit 2, capacitance detector circuit 3, detection circuit 4 and amplifier circuit 5. The resonator of oscillator circuit 1 has a fixed oscillation frequency f1, whereas the resonance circuit 2 has a resonant frequency fo somewhat different from oscillation frequency f1, as seen from FIG. 2. The resonant frequency fo is allowed to change by $\Delta f$ in response to the change $\Delta C$ in a very small capacitance when detected by detector 3, thereby permitting conversion of the change $\Delta C$ in the very small capacitance into corresponding voltage change $\Delta V$, which is amplified and derived.

There is a demand for detecting the change in each of a plurality of capacitances in an object to be tested, and processing a corresponding plurality of detection signals in different ways. For instance, a plurality of electrostatic sensors are used simultaneously to detect video signals from a plurality of disks in a video system, and a corresponding plurality of signals thus detected are subjected to parallel processing. In an attempt to carry out such parallel processing a parallel arrangement of series connections each comprising oscillator 1, resonance circuit 2, detection circuit 4 and amplifier 5 may be used. Assume that the oscillation frequency of oscillator is as high as 1 GHz, and that capacitance increment is detected at the sensitivity of $1 \times 10^{-5}$ PF. Exterior disturbance and stray capacitances which are liable to appear in the electrostatic sensor circuit included in each channel, however, will make it difficult for each sensor circuit to have the same oscillation frequency. Oscillation frequency difference between adjacent channels causes mutual interference such as beat frequency between the oscillation frequencies of the channels. For instance, assume that oscillation frequency of a selected channel is "f", and that an oscillation frequency of adjacent channel is "F". Then, interference will be caused in the form of a beat frequency of $F-f$ or $F+f$, adversely reducing the S/N ratio, preventing correct signal processing.

The oscillation frequency of oscillatin circuit 1 is selected to be 1 GHz, and the oscillation frequencies of adjacent channels can be selected to be apart from each other enough to to prevent the oscillation frequencies from mutual interference. It is, however, difficult to prevent the oscillation frequencies of each channel from producing beat frequencies when a plurality of channels are arranged. Very complicated production work is required to reduce the interference trouble using this remedy.

In order to eliminate such complicated production work the inventors proposed that a single oscillation circuit 1 be used by all channels in common. Specifically, a single oscillation circuit 1 distributes its oscillation frequency signal to the resonance circuits 2 of associated channels (See U.S. Pat. application Ser. No. 526,247). This proposed apparatus works well insofar as every channel is fixed and stationary. Assume that the channels which comprise a series connection of resonance circuit 2-to-amplifier 5 are integrally fixed to the video head of a video system and that video heads of a video system includes the channel comprising a series connection of resonant circuit 2 to amplifier circuit 5 and moves on the video disk of the video system and is conected to the resonance circuits 2 of all channels via cable or other conductors. If the cables are less flexible, movement of the video head will be adversely affected by lowering the video head's capability to detect video signals. Due to the angle of transmission of high frequency coaxial signals, cables are preferably used, but such coaxial cables are so heavy and less flexible that these cables, in fact, cannot be used. In an attempt to facilitate movement of the video head, shielded soft copper wires may be used. The wires, however, will change their shape while the video head moves on the disk, and accordingly the stray capacitance and impendance of the wires will change, thus reducing the amplitude of oscillation signals and causing distortion of the waveforms of oscillation signals. As a result, a very small change in capacitance cannot be detected. In an attempt to prevent a lowering of the oscillation signal, amplifier may be used to compensate for the reduction of the amplitude of oscillation signals. The use of such an extra amplifier, however, will cause undesired oscillation between oscillation circuit 1 and resonance circuit 2, reducing the stability of the capacitance detection system.

SUMMARY OF THE INVENTION

In view of the above, one object of the present invention is to provide a high sensitivity, multi-channel electrostatic sensor apparatus which is free of beat signals between adjacent channels, and attenuation of oscillation signals from an associated oscillator, which attenuation will adversely affect the performance of the whole apparatus.

In order to achieve this object a multi-channel electro static sensor apparatus according to the present invention comprises: a main oscillation circuit; a plurality of pull-in type sub-oscillation circuits which are adapted to synchronize with said main oscillation circuit to generate sub-frequency signals whose frequency is equal to the main oscillation frequency or a multiple thereof; and a plurality of resonance circuits each having an independent resonator separated from said main and sub-oscillation circuits, said resonator being sensitive to any change of an exterior capacitance when detected by an associated capacitance detector for changing its resonance point with respect to the sub-frequency signal, whereby a plurality of capacitance sensor channels are provided, each comprising one suboscillation circuit and one resonance circuit, and using said main oscillation circuit in common.

In operation, the oscillation signal is supplied from the main oscillator circuit to the sub-oscillator circuit of each channel. The sub-oscillation circuit generates a sub-frequency signal of the same frequency as the main oscillation circuit or a multiple of the main oscillation circuit frequency. This sub-frequency signal is applied to an associated resonance circuit, which varies its resonance point with the change of an exterior capacitance for providing a detection signal representing the change of the exterior capacitance. The detection signal is detected and amplified in each channel, and then subjected to signal processing as desired.

BRIEF DESCRIPTION OF THE ACCOMPANYING DRAWINGS

DETAILED DESCRIPTION OF PREFERRED EMBODIMENTS

Figure 3:
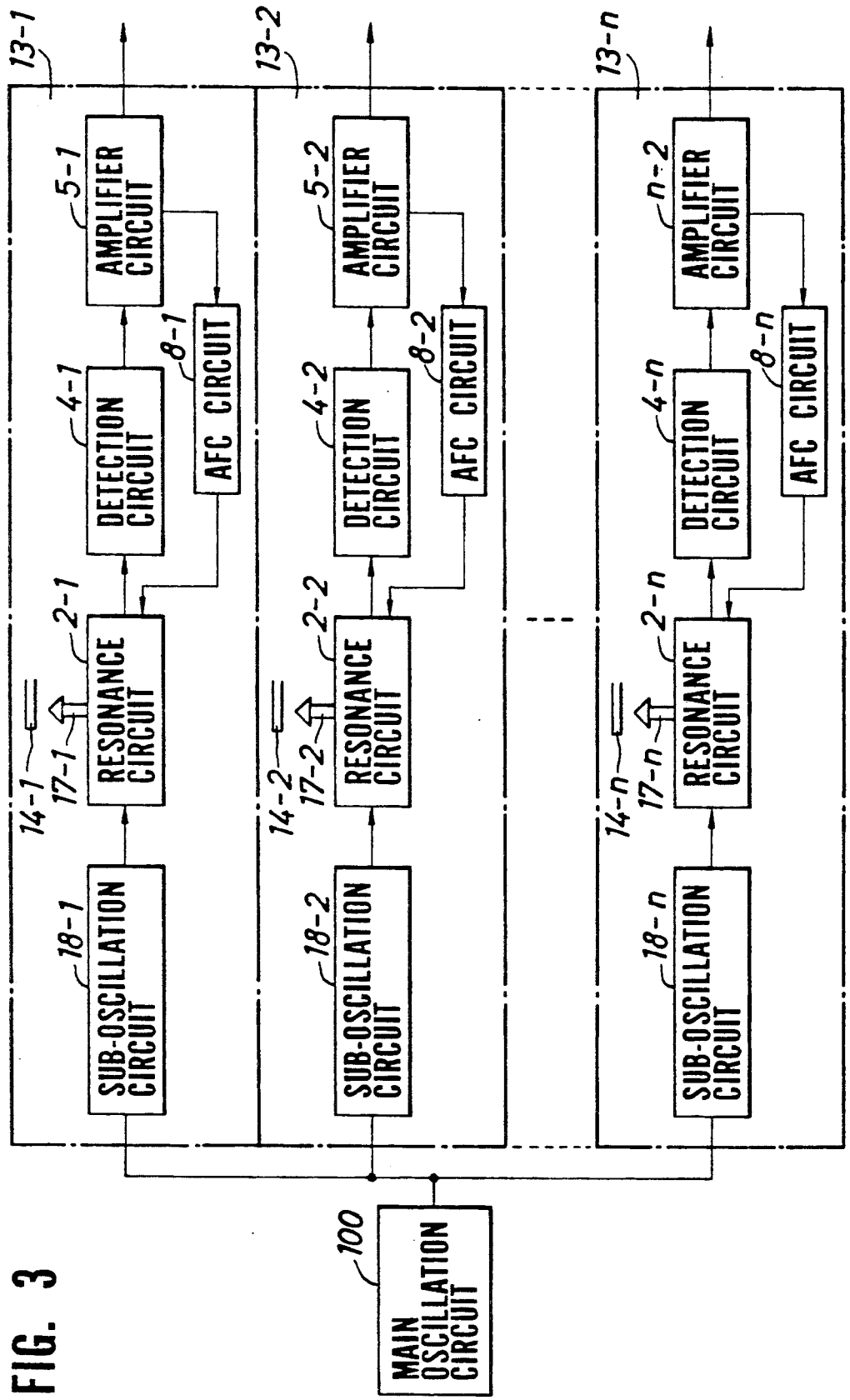
FIG. 3 is a block diagram representing a multi-channel electrostatic sensor apparatus according to the present invention.

A multi-channel electrostatic sensor apparatus according to one embodiment of the present invention will be described with reference to FIG. 3 to 5. As shown in these drawings, it comprises main oscillation circuit 100 and a plurality of electrostatic sensor circuits 13 each comprising pull-in type sub-oscillation circuit 18, resonance circuit 2, detection circuit 4, capacitance detector 11, amplifier circuit 5 and AFC circuit 8. These capacitance sensor circuits 13 are connected to main oscillation circuit 100 in common.

Figure 4:
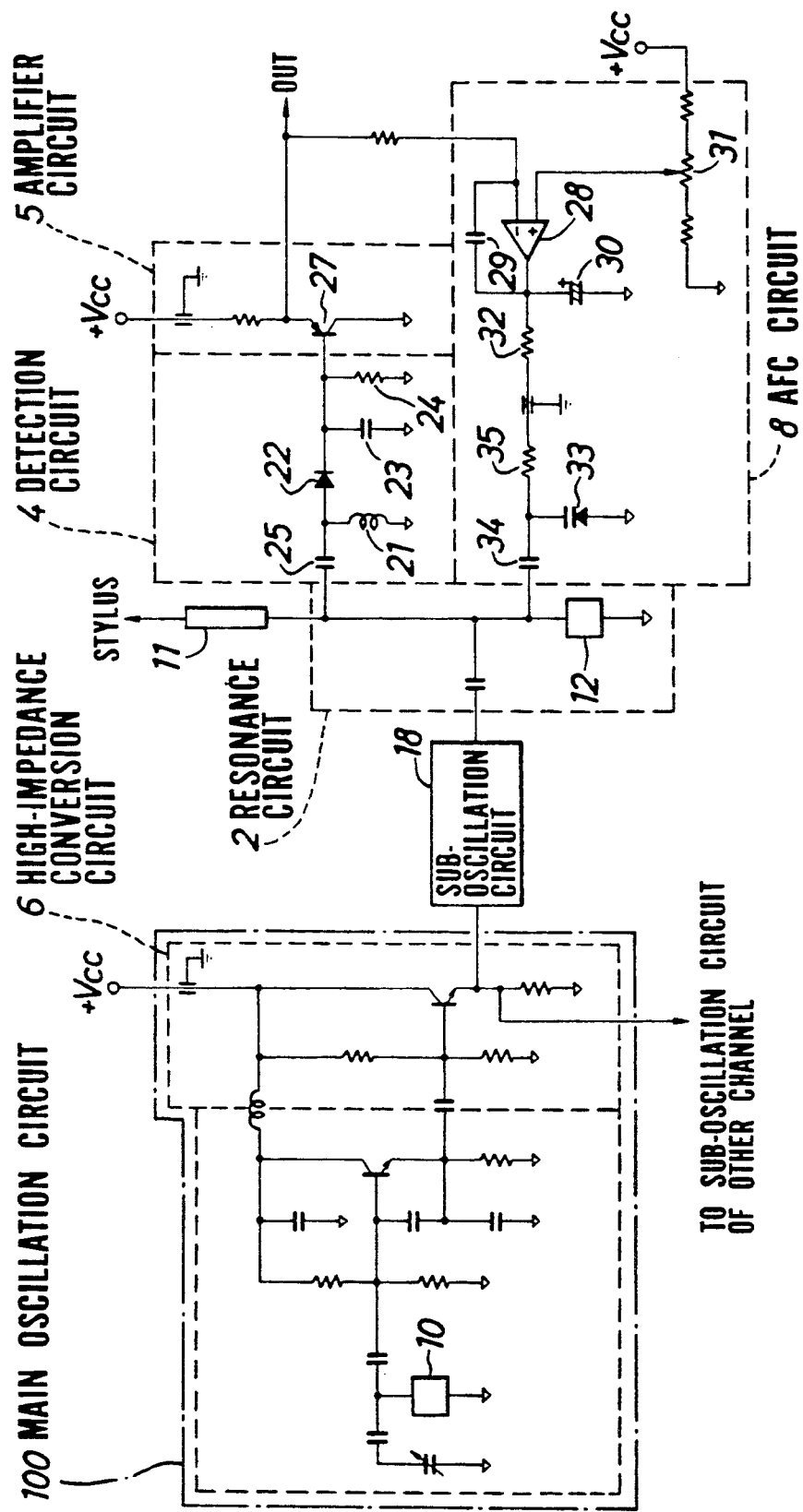
FIG. 4 shows some details of a single channel in the multi-channel electrostatic sensor apparatus according to the present invention.

As seem from FIG. 4, main oscillation circuit 100 uses a dielectric resonator such as ceramic resonator 10 which is capable of generating a fixed super-high frequency signal in the range from 1 to 1/50 times the oscillation signal of pull-in type oscillator 18. The dielectric resonator is preferably used to reduce the size of the main oscillation circuit. The super-high frequency signal is directed to sub-oscillation circuit 18 after passing through associated high-impedance conversion circuit 6. Sub-oscillation circuit 18 is a pull-in type oscillation circuit which can be put in synchronization with main oscillation circuit 100, providing a sub-oscillation signal whose frequency is equal to the main oscillation signal or a multiple of the frequency of the main oscillation signal. This sub-oscillation signal is applied to resonance circuit 2. Resonance circuit 2 comprises a ceramic resonator 12, which is separated or independent from ceramic resonator 10 of main oscillation circuit 100 and the resonator of sub-oscillation circuit 18. Capacitance detector 11 includes an electrode, stylus or other unit to detect any change of the capacitance of an object to be tested.

Detection circuit 4 is connected to ceramic resonator 12 via coupling capacitor 25. Detection circuit 4 comprises inductance element 21, diode 22, capacitor 23 and resistor 24. An output signal from resonance circuit 2 is applied to detection circuit 4 via coupling capacitor 25. Diode 22, capacitor 23 and resistor 24 together constitute the detection section of detector circuit 4. The detection section performs the envelope detection of the high-frequency signal from resonance circuit 2 to convert to a relatively low frequency signal, which is comparable to the signal from the object under, detect. Inductance element 21 is connected to the anode of diode 22, thereby preventing the relatively low forward impedance of diode 22 from functioning to the "Q" of resonance circuit 2. Specifically, capacitor 25 and inductance element 21 together constitute a high-impedance circuit to prevent the lowering of the "Q" of resonance circuit 2.

Amplifier 5 is composed of transistor 27, resistors and other elements, and amplifier 5 amplifies the signal from detection circuit 4 before applying to a signal processing circuit (not shown) and to AFC circuit 8.

AFC circuit 8 is composed of operational amplifier 28, capacitors 29,30, variable resistor 31, resistors 32,35, variable capacitance diode 33, and coupling capacitor 34. The negative-side input terminal of operational amplifier 28 is connected to the output terminal of amplifier 5 whereas the positive-side input terminal of operational amplifier 28 is connected to the slider contact of variable resistor 31. Capacitor 29 is connected between the negative-side input terminal of operational amplifier 28 and the output terminal thereof. One electrode of capactor 30 is connected to the output terminal of operational amplifier 28, and the other electrode of capacitor 30 is grounded. The output terminal of operational amplifier 28 is connected to the output terminal of resonance circuit 2 via resistors 32, 35 and coupling capacitor 34. The cathode of variable capacitance diode 33 is connected to the joint between coupling capacitor 34 and resistor 35 whereas the anode of variable capacitance diode 33 is grounded.

Operational amplifier 28 of AFC circuit 8 amplifies the signal from amplifier 5. The signal appearing at the output terminal of operational amplifier 28 is of such a low frequency that it is nearly a direct current signal thanks to the smoothing effect caused by capacitors 29,30. The signal will pass through an integrator circuit made up by capacitor 30 and resistor 32 to be integrated before applied to variable capacitance diode 33.

Variable capacitance diode 33 is biased in a negative direction. In this particular embodiment, a 12 volt power supply is used, and 6 V or more bias voltage is applied to variable capacitance diode 33 to put its operating point at a relatively deep bias voltage in vegative controlled in terms of dc level by moving the slidable contact on resistor 31. The central operating point of AFC circuit can be set as desired. Variable capacitance diode 33 is responsive to the voltage signal from the integrator circuit for changing its capcitance, and then the change in the capacitance will affect resonance circuit 2 through coupling condenser 34, thus causing the resonant frequency of resonance circuit 2 to vary. Assume that the resonant frequency of resonate circuit 2 is caused to shift rightward from "fo" for unknown reasons, as seen from FIG. 2. Then, disadvantageously the signal appearing at the output terminal of reasonance circuit 2 will fall below Vo out of the Vo-to-V1 range in which the resonance frequency-to-output voltage characteristic curve remains linear, and high-impedance is assured. In such case AFC signal is applied to reasonance circuit 2, thereby automotically shifting the resonant frequency fo leftward to prevent the signal appearing at the output terminal of resonance circuit 2 from departing from the Vo-to-V1 range. In this sense AFC unit functions as AGC (Automatic Gain Control) unit. In FIG. 4 the symbol ▽ is used to indicate grounding.

A plurality of sensor circuits 13-1 to 13-n use a main oscillation circuit 1'. The main oscillation of high frequency is directed to sub-oscillation circuits 18-1 to 18-n. A multi-channel electrostatic sensor apparatus according to the present invention can be provided on a single circuit board as a whole. However, if it is used in detecting video signals from a video system equipped with a plurality of disks, each sensor channel 13-1 to 13-n of the multi-channel electrostatic sensor apparatus may be fixed to each corresponding video head of the video system, and the main oscillation circuit 100 is separated from all sensor channels, and is connected thereto via the distributer of high-frequency gyrator 15 and associated conductors. Specifically, the main oscillation signal is distributed to "n" sensor circuits 13-1 to 13-n by high-frequency gyrator 15 and the main oscillation signal is supplied to sub-oscillation circuit 18 of each sensor circuit via semi-rigid coaxial cables or wave guides 16 and flexible shielded wire 19, as seen from FIG. 5. Signals appearing at the output terminal of amplifiers 5-1 to 5-n of sensor circuits 13-1 to 13-n may be subjected to parallel processing. Sometimes, these output signals may be divided in pairs, and differential output between each pair is subjected to a desired processing.

Figure 1:
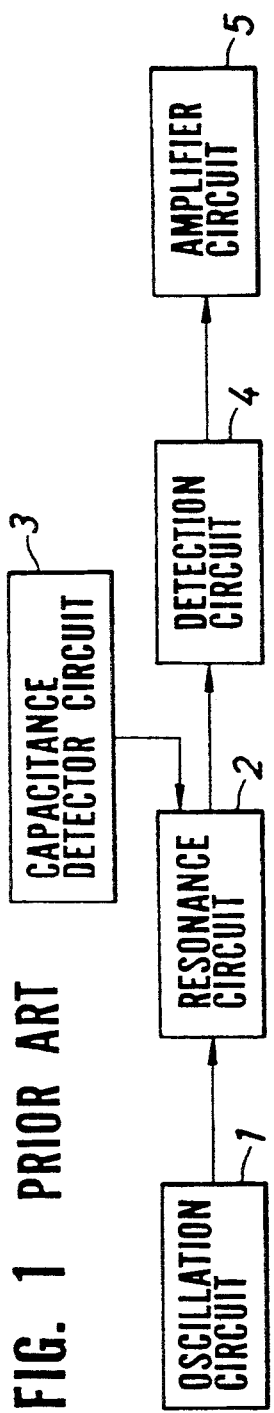
FIG. 1 is a block diagram representing a conventional electrostatic sensor apparatus.
Figure 2:
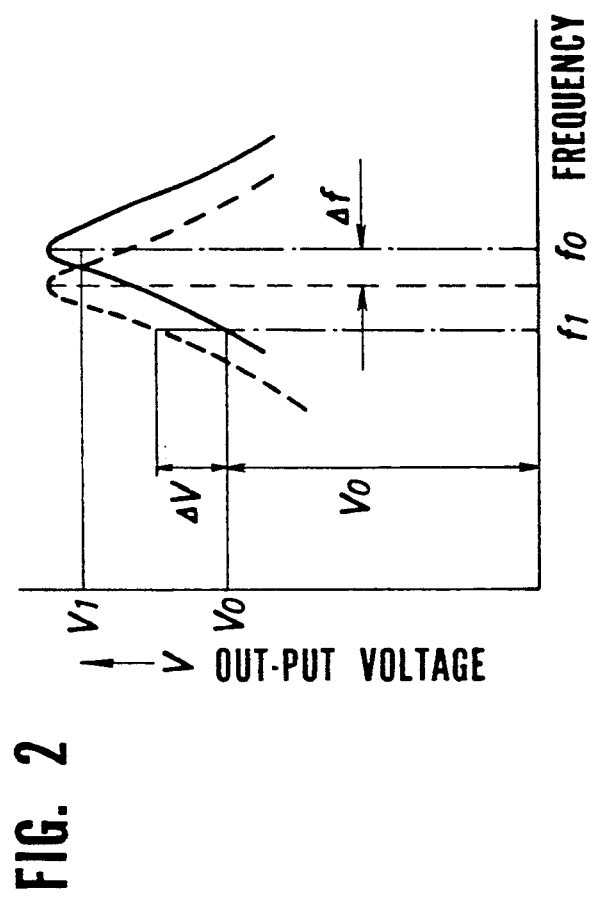
FIG. 2 shows how a very small capacitance can be detected in the electrostatic sensor.

The operation of a multi-channel eletrostatic sensor apparatus according to the present invention will be descibed as follows:

As seen from FIG. 2, sub-oscillation frequency f1 of each sub-oscillation circuit 18-1 to 18-n is set somwhat apart from the resonant frequency fo of each reasonance circuit 2. Main oscillation circuit 100 generates main frequency signal at the frequency of 1 GHz. Then, each sub-oscillation circuit 18-1 to 18-n is put in synchronism with the main oscillation signal of 1 GHz at the ratio 1-to-1 to 1-to-N to generate sub-oscillation signal, for instance, at the same frequency as the main oscillation signal (1 GHz). When objects 14-1 to 14-n move, very small capacitance increments or changes will be caused to be detected by styluses 17-1 to 17-n of detection sections 11-1 to 11-n with the result that the operating point or resonant point of resonant circuits 2-1 to 2-n change by $\Delta f$-1 to $\Delta f$-n. In the first sensor circuit 13-1 sub-oscillation signal f1 is multiplied by the resonant frequency increment $\Delta f$-1, and in the second sensor circuit 13-2 sub-oscillation signal f1 is multiplied by the resonant frequency increment $\Delta f$-2, and so forth, thus obtaining amplitude-modulated signals. In the particular embodiment the main and sub-oscillation signals have a super-high frequency such as 1 GHz, and then, the modulated signal in each sensor channel has a supper-high frequency varying about the center frequency of 1 GHz in the range corresponding to movement of objects 14-1 to 14-n and such-high frequency signals are applied to corresponding detection circuits 4-1 to 4-n in which these signals are subjected to envelope detection, thus being converted to signals in the signals range of objects 14-1 to 14-n 8 (in this particular embodiment, 3 MHz). The signals thus, converted are amplified by amplifiers 5-1 to 5-n to be directed to signal processing circuits (not shown) and to AFC circuits 8-1 to 8-n. In AFC circuits 8-1 to 8-n these signals are reduced to nearly dc signals through smoothing function provided by capacitors 29 and 30, and then such dc signals are integrator circuit to a desired level before being applied to variable capacitance diode 33. The capacitance of variable capacitance diode 33 changes with the dc signal when applied thereto, thus permitting appropriate adjustment resonant frequency fo in resonance circuit 2.

As may be understood from the above, "n" sensor circuits 13-1 to 13-n have a single oscillation circuit 100 in common, and the sub-oscillation circuits 18-1 to 18-n of all sensor circuits are synchronized with the main oscillation circuit to generate signals, for instance, at the same frequency as the main oscillation frequency, not causing any different or shift in frequency in each sub-oscillation circuit. As a result there will be no interference due to beat frequency which otherwise would appear in adjustment sub-oscillation circuits, and a very small capacitance change can be detected without fail.

In case a multi-channel senor apparatus according to the present invention is used for detecting video signals from a video apparatus, movement of the video head will cause flexible shielded wires 19 to vary in shape (see FIG. 5), accordingly varying the stray capacitance of shielded wires 19. Irrespective of the change of stray capacitance, however, it is assured that sub-oscillation circuits 18-1 to 18-n generate signals, for instance, at the same frequency as main oscillation circuit 100 because of complete synchronization being guaranteed, and therefore, a very small capacitance change can be detected even when sensor circuits 13-1 to 13-n may be moved along with the video heads of the video system.

The common use of a signal main oscillation circuit in a multi-channel electrostatic sensor apparatus permits substantial reduction of the whole sensor apparatus in size and weight.

Figure 5:
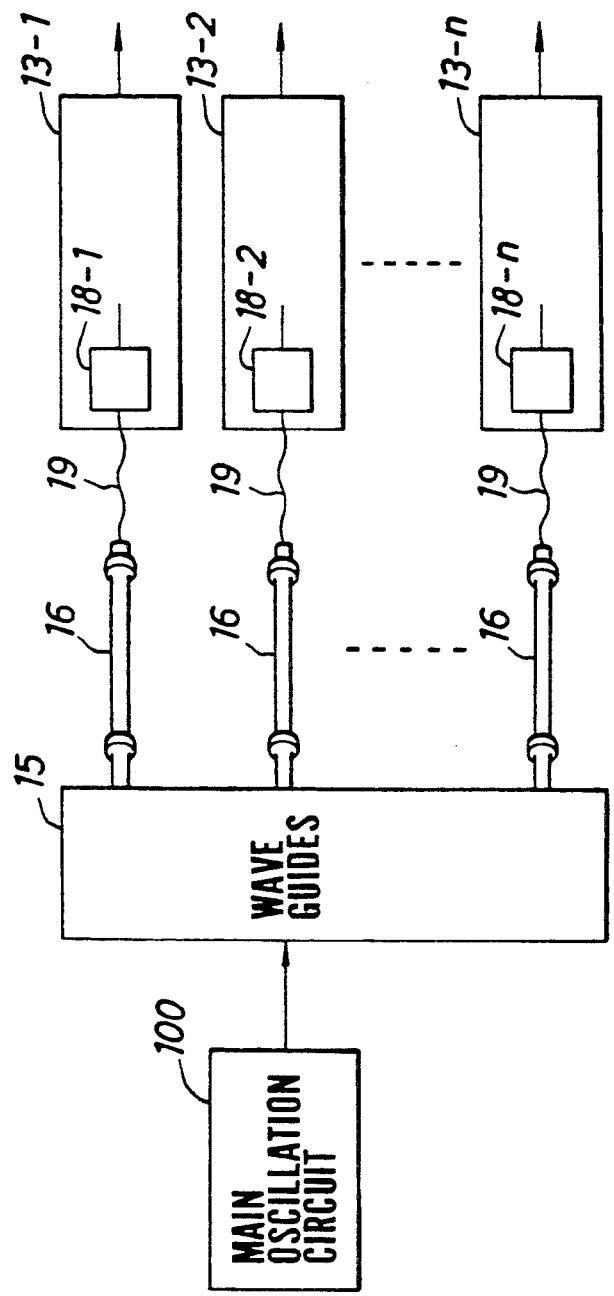
FIG. 5 shows diagrammatically the connection between the main oscillation circuit and each of the sub-oscillation circuits.

The present invention should not be limited to the embodiment described above because various modifications are possible within the scope of the present invention, as for instance follows:

Also, in this particular embodiment as shown in FIG. 5 a high-frequency gyrator is used as discributor 15. The distributor 15 may be composed of strip lines if the space permits.

In this particular emboiment the main oscillation frequency signal is directed to sub-oscillation circuits 18-1 to 1-n via wave guides 16 and flexible shielded wires 19. However, the shapes of flexible shielded wires 19 may vary with movement of the video heads on which sensor circuit are fixed with the result that the stray capacitances of flexible shielded wires 16 cause significant deformation of signals. In an attempt to prevent such adverse effect, bandpass filters may be provided between main oscillation circuit 100 and sub-oscillation circuits 18-1 to 18-n, thereby preventing distortion of signal, attenuation of signals or mismatching of impedance.

In this particular embodiment sub-oscillation circuits 18-1 to 18-n are designed to generate signals at the same frequency as the main oscillation frequency. Sub-oscillation circuits 18-1 to 18-n may be of pull-in type whose frequency is a multiple of the frequency of the main oscillation circuit 100. if the main oscillation frequency is selected to be 10 or more GHz. and if sensor circuits 13-1 to 13-n are fixed to the video heads of a video system, allowing sensor circuits 13-1 to 13-n to move along with the video heads as seen from FIG. 5, there is a fear of adverse effects such as the distortion or a attenuation of signals, which are caused by allowing the shapes of flexible shielded wires 19 to vary while followingnth video heads. In an attempt to reduce such adverse effects, the main frequency of main oscillation circuit 100 is selected to be 2,4,6 . . . times less than sub-frequency of sub-oscillation circuit 13-1 to 13n. For example, the main oscillation frequency of the main oscillation circuit is selected to be 100 $KH_2$ and the oscillation frequency of the sub-oscillation circuit (13-1 to 13-n) is selected to be 1 $GH_2$, thus permitting the main oscillation frequency to be lowered below the frequency at which little or no adverse effect will be caused by the varying shape of cables or flexible shielded wires 19, thereby permitting determination of a very small capacitance change.

In this particular embodiment main oscillation circuit 100 is separted from sub-oscillation circuit 13-1 to 13-n. However, main oscillation circuit 100 may be included in a selected sensor circuit.

A multi-channel electrostatic sensor apparatus according to the present invention uses a oscillation circuit in common and a plurality of pull-in type sub-oscillation circuits, thus permitting the sub-oscillation circuits to operate at the same frequency as the main oscillation circuit or at a multiple of the main oscillation frequency. This arrangement has the effect of preventing appearance of beat signals caused by interference between adjacent sensor circuits, thus permitting detection of a very small capacitance change.

In case sensor circuits 13-1 to 13-n on the video head of a video system are connected to main oscillation circuit 100 by flexible shielded wires 19 to permit relatively free movement of sensor circuits 13-1 to 13-n, the stray capacitance will vary with the change of the shape of flexible shielded wires 19, and the impedance matching can be hardly obtained. Sub-oscillation circuits 18, however, is guaranteed from generating signals at the same frequency as the main oscillation circuit or at a multiple of the main oscillation frequency. This permits detection of video signals at an increased sensitivity, compared with a conventional electrostatic detection apparatus. A mult-channel electrostatic senor apparatus according to the present invention uses a main oscillation circuit in common, and accordingly the size and weight of the whole system is substantially reduced, compared with a conventional multi-channel electrostatic sensor apparatus using a main oscillation circuit allotted to each sensor circuit.

As described above, there is no fear of interference between main and sub-oscillation circuits, and therefore adjacent sensor channels can be put close to each other, accordingly permitting increase of the density with which sensor circuits are arranged.

The present invention shoudl not be limited to the embodiment described above because various modifications are possible within the scope of the present invention.

What we claim is:

1. A multi-channel electrostatic sensor apparatus comprising:

a main oscillation circuit for generating main-oscillation signals;

a plurality of sub-oscillation circuits adapted to synchronize with said main oscillation signals for generating sub-oscillation signals;

connecting means for connecting said main oscillation circuit and each of said sub-oscillation circuits thereby to supply said main oscillation signal to said sub-oscillation circuits; and a plurality of resonance circuits each having an independent resonator separated from said main and sub-oscillation circuits, said resonance circuit being sensitive to any change to exterior capacitance detected by an associated detector to change resonance point thereof:

whereby a plurality of sensor circuits each comprising a sub-oscillation circuit and a resonance circuit are provided using said main oscillation circuit in common for a plurality of channels.

2. A multi-channel electrostatic sensor apparatus according to claim 1 wherein said sensor circuit includes a detection circuit for detecting the output of said resonance circuit, an amplifier circuit for amplifing the output of said detection circuit and an AFC circuit for controlling the resonance point of said resonance circuit on the basis of said amplifier circuit.

3. A multi-channel electrostatic sensor apparatus according to claim 1 wherein sdaid main oscillation circuit and said resonance circuit have their respective ceramic resonators.

4. A multi-channel electrostatic sensor apparatus according to claim 1 wherein an distributor is connected to the output terminal of said main oscillation circuit for distributing the main frequency signals generated by said main oscillation circuit and the main frequency signals thus distributed are transmitted to each of said sensor circuits through coaxial cables and shielded wires.

5. A multi-channel electrostatic sensor apparatus according to claim 1 wherein said connecting means comprises a distributor for distributing said main oscillating signal from said main oscillation circuit to said sub-oscillation circuits.

6. A multi-channel electrostatic sensor apparatus according to claim 5 wherein a semi-rigid coaxial cables and flexible shielded wires are connected in series between said distributor and said sub-oscillation circuits.

7. A multi-channel electrostatic sensor apparatus according to claim 6 wherein wave guides and flexible shielded wires are connected in series between said distributor and said sub-oscillation circuits.

8. A multi-channel electrostatic sensor apparatus according to claim 1 wherein said sub-oscillation signals has a frequency equal to the oscillation frequency of said main oscillation circuit.

9. A multi-channel electrostatic sensor apparatus according to claim 1, wherein said sub-oscillation signals have a multiple of the oscillation frequency of said main oscillation circuit.

* * * * *

UNITED STATES PATENT AND TRADEMARK OFFICE
CERTIFICATE OF CORRECTION

PATENT NO. : 5,128,622

DATED : Jul. 7, 1992

INVENTOR(S) : Masuda et al.

It is certified that error appears in the above-identified patent and that said Letters Patent is hereby corrected as shown below:

Title Page:

In item [56], line 3 on the face of the patent, delete "11/1987" and substitute therefor --11/1977--;

In item [56], second column, line 4, delete "Kenneth A. Wider" and substitute therefor --Kenneth A. Wieder--;

In column 1, line 66, delete "oscillatin" and substitute therefor --oscillation--;

In column 2, line 40, before "amplifier" insert --an--;

In column 3, line 45, delete "seem" and substitute therefor --seen--;

In column 4, line 9, delete ", detect" and substitute therefor --test--;

In column 4, line 52, delete "vegative" and substitute therefor --negative--;

In column 5, line 1, delete "automotically" and substitute therefor --automatically--;

In column 5, line 66, delete "thus," and substitute therefor --thus--;

In column 6, line 4, before "integrator circuit" insert --integrated by--;

UNITED STATES PATENT AND TRADEMARK OFFICE
CERTIFICATE OF CORRECTION

PATENT NO. : 5,128,622
DATED : Jul. 7, 1992
INVENTOR(S) : Masuda et al.

It is certified that error appears in the above-identified patent and that said Letters Patent is hereby corrected as shown below:

In column 6, line 15, delete "different" and substitute therefor --difference--;

In column 6, line 20, delete "senor" and substitute therefor --sensor--;

In column 6, line 33, delete "signal" insert --single--.

In column 6, line 45, delete "emboiment" and substitute therefor --embodiment--;

In column 6, line 47, delete "1-n" and substitute therefor --18-n--;

In column 6, line 56, delete "signal" and substitute therefor --signals--;

In column 7, line 3, delete "lowingnth" and substitute therefor --lowing the--;

In column 7, line 8, delete "$KH_2$" and substitute therefor --$KH_z$--;

In column 7, line 10, delete "$GH_2$" and substitute therefor --$GH_z$--;

In column 7, line 21, after "uses a" insert --main--;

In column 7, line 37, delete "from" and substitute therefor --for--;

UNITED STATES PATENT AND TRADEMARK OFFICE
CERTIFICATE OF CORRECTION

PATENT NO. : 5,128,622
DATED      : Jul. 7, 1992
INVENTOR(S): Masuda et al.

It is certified that error appears in the above-identified patent and that said Letters Patent is hereby corrected as shown below:

In column 7, line 42, delete "senor" and substitute therefor --sensor--; "mult" should be --multi--.

In column 7, line 54, delete "shoudl" and substitute therefor --should--.

Signed and Sealed this

Seventeenth Day of May, 1994

Attest:

BRUCE LEHMAN

Attesting Officer     Commissioner of Patents and Trademarks